US010711766B2

(12) United States Patent
Ambekar et al.

(10) Patent No.: US 10,711,766 B2
(45) Date of Patent: Jul. 14, 2020

(54) SYSTEM AND METHOD FOR OPTIMAL OPERATION OF WIND FARMS

(71) Applicant: General Electric Company, Schenectady, NY (US)

(72) Inventors: Akshay Krishnamurty Ambekar, Karnataka (IN); Vishal Cholapadi Ravindra, Karnataka (IN); Benoit Philippe Petitjean, Munich (DE); Kalpit Vikrambhai Desai, Karnataka (IN)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 14/813,547

(22) Filed: Jul. 30, 2015

(65) Prior Publication Data
US 2016/0032894 A1 Feb. 4, 2016

(30) Foreign Application Priority Data

Jul. 31, 2014 (IN) .......................... 3768/CHE/2014

(51) Int. Cl.
*F03D 7/02* (2006.01)
*F03D 7/04* (2006.01)

(52) U.S. Cl.
CPC ........... *F03D 7/048* (2013.01); *F03D 7/0296* (2013.01); *F05B 2270/333* (2013.01); *Y02E 10/723* (2013.01)

(58) Field of Classification Search
None
See application file for complete search history.

(56) References Cited

U.S. PATENT DOCUMENTS 7,896,613 B2   3/2011 Xiong
8,215,907 B2   7/2012 Kooijman et al.
(Continued)

FOREIGN PATENT DOCUMENTS

WO   2003064853 A1   8/2003
WO   2010061255 A2   6/2010
WO   2013023660 A1   2/2013

OTHER PUBLICATIONS

Romero-Sanz et al., "Noise Management on Modern Wind Turbines", Wind Engineering, vol. No. 32, Issue No. 1, pp. 27-44, Jan. 2008.

*Primary Examiner* — Rocio Del Mar Perez-Velez
*Assistant Examiner* — Hung H Dang
(74) *Attorney, Agent, or Firm* — Dority & Manning, P.A.

(57) ABSTRACT

A method implemented using at least one processor module includes receiving a plurality of operational parameters corresponding to a plurality of wind turbines and obtaining a plurality of source sound power values corresponding to the plurality of wind turbines. The method further includes obtaining a receptor sound pressure value corresponding to a receptor location and estimating an attenuation model based on the plurality of source sound power values, and the receptor sound pressure value. The attenuation model disclosed herein comprises a plurality of attenuation coefficients. The method also includes determining at least one turbine set-point corresponding to at least one wind turbine among the plurality of wind turbines based on the plurality of attenuation coefficients, and the plurality of turbine operational parameters.

17 Claims, 4 Drawing Sheets

(56) References Cited

U.S. PATENT DOCUMENTS

| | | |
|---|---|---|
| 8,258,643 B2 | 9/2012 | Bonnet |
| 8,426,994 B2 | 4/2013 | Nielsen et al. |
| 2006/0224357 A1* | 10/2006 | Taware .................... G05B 9/02 702/179 |
| 2007/0031237 A1* | 2/2007 | Bonnet ................ F03D 7/0296 415/1 |
| 2010/0135798 A1 | 6/2010 | Eggleston |
| 2010/0143117 A1* | 6/2010 | Xiong ................... F03D 7/0296 416/1 |
| 2011/0175356 A1* | 7/2011 | Nielsen ................ F03D 7/0296 290/44 |
| 2011/0223018 A1 | 9/2011 | Srinivasan et al. |
| 2012/0016640 A1* | 1/2012 | Murphy ................ G10K 15/02 703/2 |
| 2012/0025530 A1* | 2/2012 | Kinzie ................. F03D 7/0296 290/44 |
| 2012/0139254 A1* | 6/2012 | Attia .................... F03D 7/0296 290/55 |
| 2013/0140818 A1 | 6/2013 | Matesanz Gil |
| 2015/0110276 A1* | 4/2015 | Gereb .................... G01H 3/125 381/56 |

* cited by examiner

SYSTEM AND METHOD FOR OPTIMAL OPERATION OF WIND FARMS

BACKGROUND

A system and method are disclosed for optimized operation of wind turbines in a wind farm. More specifically, the operating set-points for a plurality of wind turbines are determined minimizing the power loss over the wind farm while operating the plurality of wind turbines to satisfy regulatory noise constraints at a plurality of receptor locations.

Wind power is one of the most environmentally friendly energy sources available at present. Wind turbines installed over towers are driven by the wind to generate electric power. A modern wind turbine typically includes one or more rotor blades for capturing kinetic energy of wind and transmits the kinetic energy to turn a shaft coupling the rotor blades to a gearbox, or a generator. The generator converts the mechanical energy to electrical energy and the electrical energy is distributed to a grid.

The wind turbine generates aerodynamic noise due to the rotation of the rotor blades through air. A periodic pulsing sound is heard in the near field due to the amplitude modulation of the aerodynamic noise. Regulations by government agencies restrict maximum decibel (dB) levels for noise emissions from wind turbines operating around residential communities and other populated areas. Wind turbine noise is in near-field is specified and measured based on IEC 61400-11 standard. Noise estimates in far fields of about 1 km to 4 kms from the wind turbine are determined based on the near-field noise using noise propagation models. Noise propagation models are not reliable, especially in complex terrain or during cross wind propagation. In order to account for deficiency of noise propagation models, conservative noise estimates are considered to ensure compliance with government regulations thereby operating the wind turbines at sub optimal set-points.

Aerodynamic noise from the wind turbines at a far field location may be reduced by de-rating all of the wind turbines within a wind farm. The de-rating of wind turbines may be effected by reducing the speed of the wind turbine blades or by controlling the pitch angle of the blades. However, de-rating of wind turbines would reduce the power production of the wind farm.

Enhanced techniques for controlling the operation of the wind turbines of the wind farm are required.

BRIEF DESCRIPTION

In accordance with one aspect of present technique, a method is disclosed. The method includes receiving a plurality of operational parameters corresponding to a plurality of wind turbines and obtaining a plurality of source sound power values corresponding to the plurality of wind turbines. The method further includes obtaining a receptor sound pressure value corresponding to a receptor location and estimating an attenuation model based on the plurality of source sound power values, and the receptor sound pressure value. The attenuation model disclosed herein comprises a plurality of attenuation coefficients. The method also includes determining at least one turbine set-point corresponding to at least one wind turbine among the plurality of wind turbines based on the plurality of attenuation coefficients, and the plurality of turbine operational parameters.

In accordance with one aspect of present technique, a system is disclosed. The system includes at least one processor module and a memory module coupled to a communications bus. The system further includes a signal acquisition module configured to receive a plurality of turbine operational parameters corresponding to a plurality of wind turbines and obtain a plurality of source sound power values corresponding to the plurality of wind turbines. The signal acquisition module is also configured to obtain a receptor sound pressure value corresponding to a receptor location, The system includes an attenuation model generator module communicatively coupled to the signal acquisition module and configured to estimate a plurality of attenuation coefficients based on the plurality of source sound power values and the receptor sound pressure value. The system also includes a farm control optimization module communicatively coupled to the attenuation model generator module and configured to determine at least one set-point corresponding to at least one wind turbine among the plurality of wind turbines based on the plurality of attenuation coefficients and the plurality of turbine operational parameters. At least one of the signal acquisition module, the attenuation model generator module, and the farm control optimization module of the system is stored in the memory module and executable by the at least one processor module.

In accordance with another aspect of the present technique, a non-transitory computer readable medium having instructions to enable at least one processor module is disclosed. The instructions enable the at least one processor to receive a plurality of turbine operational parameters corresponding to a plurality of wind turbines and obtain a plurality of source sound power values corresponding to the plurality of wind turbines. The instructions further enable the at least one processor to obtain a receptor sound pressure value corresponding to a receptor location. The instructions further enable the at least one processor to estimate an attenuation model having a plurality of attenuation coefficients, based on the plurality of source sound power values, and the receptor sound pressure value. The instructions also enable the at least one processor to determine at least one set-point corresponding to at least one wind turbine among the plurality of wind turbines based on the plurality of attenuation coefficients, and the plurality of turbine operational parameters.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
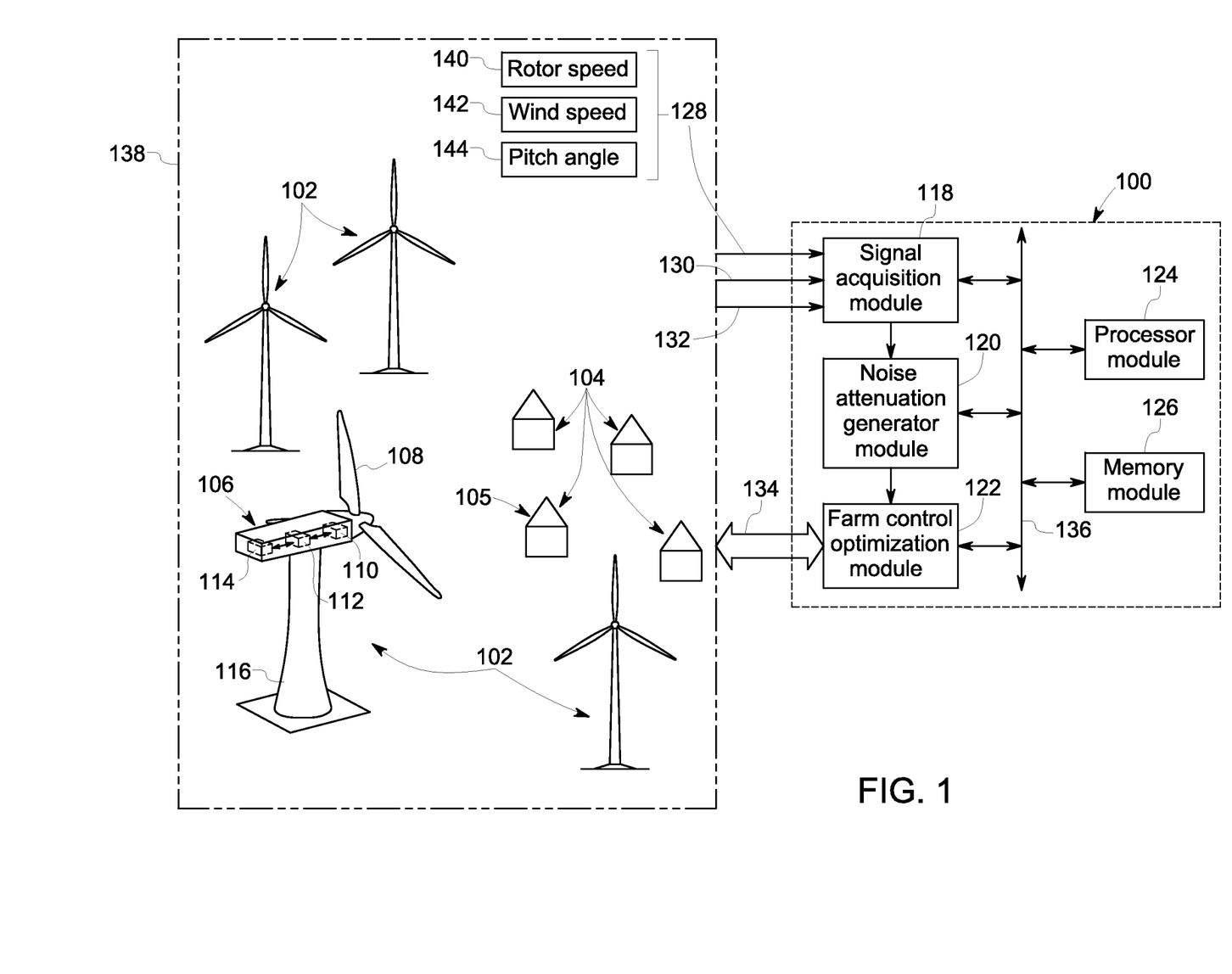
FIG. 1 is a diagrammatic illustration of a system for optimizing the operation of a plurality of wind turbines in accordance with an exemplary embodiment.

Embodiments of a methods and a system for optimizing the operation of a plurality of wind turbines of a wind farm include receiving a plurality of operational parameters of the plurality of wind turbines. The embodiments further include obtaining a plurality of source sound power values corresponding to the plurality of wind turbines and at least one receptor sound pressure value corresponding to a receptor location. An attenuation model is estimated based on the plurality of sound power values and at least one receptor sound pressure value, wherein the attenuation model includes a plurality of attenuation coefficients. At least one turbine set-point corresponding to at least one wind turbine among the plurality of wind turbines is determined based on the plurality of attenuation coefficients, and the plurality of turbine operational parameters using a constrained optimization technique. A power output value of the at least one wind turbine is modified based on the at least one turbine set-point FIG. 1 is a diagrammatic illustration of a system 100 for optimizing the operation of a wind farm 138 in accordance with an exemplary embodiment. The system 100 is communicatively coupled to a plurality of wind turbines 102, and a plurality of receptor location 104 of the wind farm 138. Each of the plurality of wind turbines 102 has a nacelle 106 enclosing a gearbox 110 coupled to a generator 112. The nacelle 106 also includes a controller 114 communicatively coupled to the gearbox 110, and the generator 112. Each of the plurality of wind turbines 102 includes one or more blades 108 and the wind turbine is mounted on a tower 116. In one exemplary embodiment, each of the plurality of wind turbines 102 is equipped with a near field microphone for acquiring a source sound power value generated by the corresponding wind turbine. A plurality of source sound power values 130 corresponding to the plurality of wind turbines are generated. The wind farm 138 includes at least one receptor location 105 equipped with a far field microphone for obtaining a receptor sound pressure value. In general, embodiments of the techniques disclosed herein includes a plurality of receptor sound pressure values 132 acquired from a plurality of far field microphones disposed at the plurality of receptor locations 104. In the wind farm 138, each of the plurality of receptor locations 104 receives noise contributions from one or more of the plurality of wind turbines 102.

The term 'sound power value" used herein refers to an electrical parameter representative of acoustic 'sound pressure level (SPL)' either generated by the wind turbine or received at the receptor location. Measurements of receptor sound pressure values are referred herein as 'receptor sound pressure measurements'. Estimates of receptor sound pressure values are referred as 'receptor sound pressure estimates'. Measurements of source sound power values are used interchangeably herein with the term 'source sound power measurements'. Estimates of source sound power values are used interchangeably with the term 'source sound power estimates'.

The system 100 includes a signal acquisition module 118, a noise attenuation model generator module 120, a farm control optimization module 122, at least one processor module 124, and a memory module 126. The modules of the system 100 are communicatively coupled via a communications bus 136. The signal acquisition module 118 is communicatively coupled to the wind farm 138 and is configured to receive measured data from the wind farm. The farm control optimization module 122 is communicatively coupled to the wind farm 138 and is configured to provide control data for optimized operation of at least one wind turbine.

The signal acquisition module 118 receives a plurality of operational parameters 128 corresponding to the plurality of wind turbines 102. The operational parameters 128 include, but not limited to, rotor speed 140, wind speed 142, and one or more pitch angles 144 of the rotor blades corresponding to each of the plurality of wind turbines. The signal acquisition module also obtains the plurality of source sound power values 130 corresponding to the plurality of wind turbines and the at least one receptor sound pressure value 132 corresponding to the at least one receptor location. In one embodiment, the plurality of source power values 130 and the at least one receptor sound pressure value 132 are measured by a permanent hardware setup including a plurality of field microphones disposed in the plurality of wind turbines 102 and in the at least one receptor location 104. In another embodiment, the plurality of source power values 130 and the at least one receptor sound pressure value 132 are measured by a temporary hardware setup. In one embodiment, the temporary hardware setup includes the plurality of field microphones deployed for a couple of weeks every three to six months.

In an exemplary embodiment, the plurality of source sound power values 130 are estimated based on the plurality of operational parameters 128. For each wind turbine, the rotor speed 140, the wind speed 142, and the pitch angles 144 are measured and a wind-turbine model is used to estimate the source sound power value corresponding to the wind turbine. In one embodiment, an empirical model is used for modelling the wind turbine. In some embodiments, at least one receptor sound pressure value 132 is estimated based on the plurality of source sound power values 130. In one embodiment, a linear model is used to estimate at least one receptor sound pressure value 132. The working of the linear model used to generate the receptor sound pressure estimate is explained in a subsequent paragraph. In one embodiment, the signal acquisition module 118 is stored in the memory module and executable by the at least one processor module 124. In another embodiment, the signal acquisition module 118 is a stand-alone hardware module configured to receive the plurality of operational parameters 128, a plurality of source sound power values 130, and the at least one receptor sound pressure value 132.

The noise attenuation model generator module 120 is communicatively coupled to the signal acquisition module 118 and configured to estimate a plurality of attenuation coefficients. In some embodiments, the noise attenuation model is generated based on the plurality of source sound power values 130 and the at least one receptor sound pressure value 132. Attenuation models determined based on input and output data are referred herein as 'data driven models'. In one such embodiment, a receptor model generating receptor sound pressure estimates, is determined using techniques such as machine learning and statistical regression techniques. The receptor model is based on the relative geometry of the plurality of wind turbines 102 and the at least one receptor location 104. The accuracy of the receptor model is validated using cross-validation technique. In another embodiment, a parametric empirical model such as ISO 9613-2 model, is used to estimate the at least one receptor sound pressure value 132. In yet another embodiment, a hybrid model combining the parametric empirical model and a data driven models is used for estimating the at least one receptor sound pressure value 132.

In an exemplary embodiment, a linear least square technique is use to determine the plurality of attenuation coefficients of the linear model. In another exemplary embodiment, a non-linear technique such as a non-linear least squares, or a Levenberg-Marquardt method, is used to estimate parameter values of the parametric empirical model. In one embodiment, the noise attenuation model generator module 120 is stored in the memory module and executable by the at least one processor module 124. In another embodiment, the noise attenuation model generator module 120 is a stand-alone hardware module configured to estimate a plurality of attenuation coefficients based on the plurality of source sound power values and the plurality of receptor sound pressure values. In one embodiment, the plurality of attenuation coefficients are determined for every six two twelve hours. In another embodiment, the plurality of attenuation coefficients are determined once every day. In alternative embodiments, the plurality of attenuation coefficients are determined once in a week or once in a month.

The farm control optimization module 122 is communicatively coupled to the noise attenuation model generator module 120 and configured to determine at least one set-point 134 corresponding to at least one wind turbine among the plurality of wind turbines based on the plurality of attenuation coefficients and the plurality of turbine operational parameters. The terms 'set-point' and 'turbine set-point' used herein interchangeably refer to the operating condition of a wind turbine. In an exemplary embodiment, a plurality of set-points corresponding to the plurality of wind turbines are determined using a constrained optimization technique in real time for prevailing ambient conditions. The ambient conditions referred herein include, but not limited to, wind direction, wind speed and the plurality of attenuation coefficients. The plurality of set-points may be used to modify power output values of the corresponding wind turbines. In one embodiment, the farm control optimization module 122 is stored in the memory module and executable by the at least one processor module 124. In another embodiment, the farm control optimization module 122 is a custom made hardware module configured to perform constrained optimization maximizing a combined power output value of the plurality of wind turbines constraining the plurality of receptor sound pressure values within a regulation limit value.

The at least one processor module 124 includes at least one arithmetic logic unit, a microprocessor, a general purpose controller or a processor array to perform the desired computations. In one embodiment, the functionality of the at least one processor module 124 may be limited to receive operational parameters 128. In another embodiment, the functionality of the at least one processor module 124 may be limited to determine the plurality of attenuation coefficients. In another embodiment, the functionality of the at least one processor module 124 is limited to determine the at least one turbine set-point. In some exemplary embodiments, functionality of the at least one processor module would include one or more of the functions of the signal acquisition module 118, the noise attenuation model generator module 120, and the farm control optimization module 122. While the processor module 124 is shown as a separate unit, there can be a processor co-located or integrated in one or more of the modules 118, 120, 122. Alternatively, the processor module 124 can be local or remote, such as a central server or cloud based, with the communications bus 136 can be wired, wireless or a combination thereof.

The memory module 126 may be a non-transitory storage medium. For example, the memory module 126 may be a dynamic random memory (DRAM) device, a static random access memory (SRAM) device, flash memory or other memory devices. In one embodiment, the memory module 126 may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one specific embodiment, a non-transitory computer readable medium having instructions to enable the at least one processor module 124 to determine the. operating set-points for the plurality of wind turbines.

Figure 2:
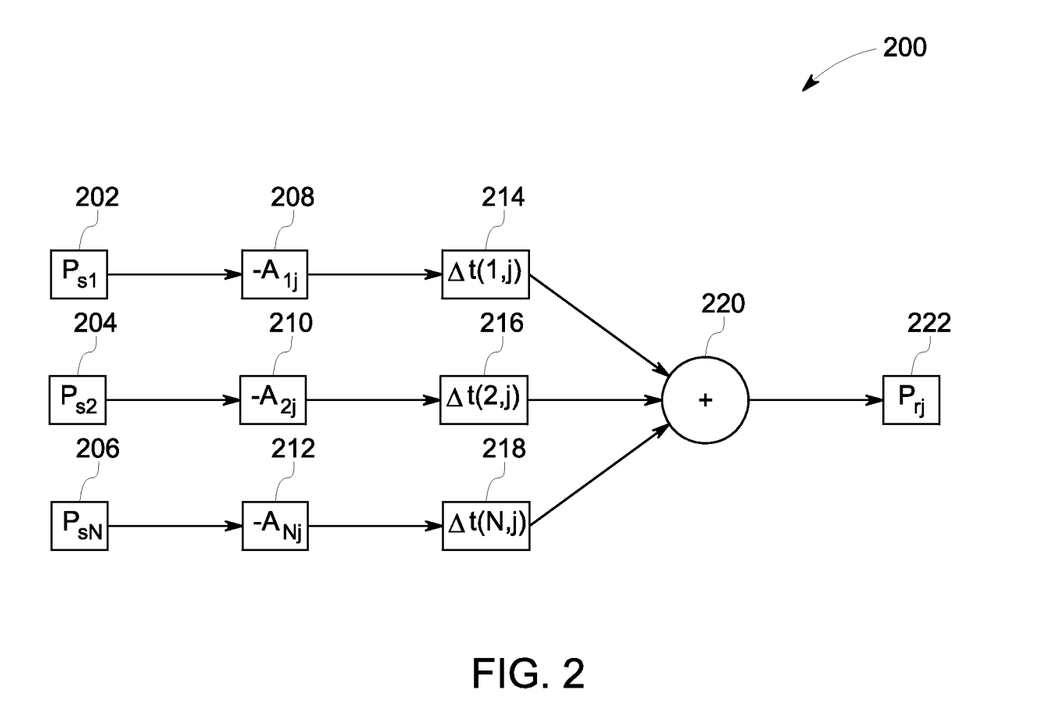
FIG. 2 is a linear model for estimating receptor noise in accordance with an exemplary embodiment.

FIG. 2 is a linear model 200 for estimating receptor noise in accordance with an exemplary embodiment. The linear model 200 represents an attenuation model for estimating receptor sound pressure value $P_{rj}$ corresponding to $j^{th}$ receptor location among M receptor locations of a wind farm having N wind turbines. Each of the plurality of source sound power values 202, 204, 206 experiences an attenuation and a time delay before combined by an adder 220 to generate the receptor sound pressure value 222 corresponding to the $j^{th}$ receptor location. The plurality of attenuation coefficients 208, 210, 212 and the plurality of time delays 214, 216, 218 correspond to the plurality of source sound power values 202, 204, 206 respectively.

A set of linear equations is obtained from the linear model 200 represented as a matrix equation as:

$$A\underline{x} = \underline{b} \quad (1)$$

where, $$A = \begin{bmatrix} P_{s1}(t_{11}) & P_{s2}(t_{12}) & P_{sN}(t_{1N}) \\ P_{s1}(t_{21}) & P_{s1}(t_{22}) & P_{s1}(t_{2N}) \\ P_{s1}(t_{K1}) & P_{s1}(t_{K2}) & P_{s1}(t_{KN}) \end{bmatrix}, \quad (2)$$

$$\underline{b} = \begin{bmatrix} P_{rj}(t_1) \\ P_{rj}(t_2) \\ P_{rj}(t_K) \end{bmatrix},$$

$$\underline{x} = \begin{bmatrix} 1/A_{1j} \\ 1/A_{2j} \\ 1/A_{Nj} \end{bmatrix}$$

where, $P_{si}$ is the source sound power value corresponding to the $j^{th}$ wind turbine among the N wind turbines, $P_{rj}$ is the receptor sound pressure value corresponding to the $j^{th}$ receptor location among M receptor locations, $A_{ij}$ is the attenuation coefficient corresponding to a transmission path from the wind turbine i to the receptor location j. The time stamp $t_k$ represents time stamp of receptor sound pressure value, and time index $t_{ki}$ is a time stamp given by:

$$t_{ki} = t_k - \Delta t(i,j) \quad (3)$$

where, $\Delta t(i,j)$ is propagation delay between the $i^{th}$ wind turbine and the $j^{th}$ receptor location.

In an exemplary embodiment, the plurality of source sound power values $P_{si}$ and the plurality of receptor sound pressure values $P_{rj}$ correspond to one of the octave mid-band frequency. In one embodiment, the system of linear equations (2) is obtained for eight octave bands. It should be noted herein that the technique is not limited by eight octave bands and a different frequency band analysis such as one-third octave bands or narrowband frequency components, is used in other embodiments. The plurality attenuation coefficients of the vector x correspond to the $j^{th}$ receptor location. In one embodiment, the plurality of attenuation coefficients are obtained by using a least squares method. The plurality of attenuation coefficients corresponding to each of the other receptor locations may be determined in the same way by choosing the matrix A and the vector b in Eq. (1) corresponding to the other receptor locations. In one embodiment, the receptor model is used to determine an attenuation coefficient $A_{ij}$, corresponding to the wind turbine index i and the receptor location index j as:

$$A_{ij} = \frac{\partial(P_{rj})}{\partial(P_{si})}\bigg|_{t=t1} + \ldots + \frac{\partial(P_{rj})}{\partial(P_{si})}\bigg|_{t=t1-\Delta t(i,j)} \qquad (4)$$

where, $\partial(P_{rj})/\partial(P_{si})$ is a partial derivative of receptor sound pressure $P_{rj}$ with reference to source sound power $P_{si}$ obtained either analytically or empirically using perturbations.

In one embodiment, the parametric empirical model such as an ISO 9613-2 far-field noise propagation model is used for determining the plurality of attenuation coefficients. In the ISO 9613-2 model, the plurality of attenuation coefficients for a given wind turbine and a receptor location for a given octave band is given by:

$$A_{ij}(\omega) = A_{ij\_known}(\omega) + A_{ij\_unknown}(\omega) \qquad (5)$$

where, the $A_{ij\_known}$ is due to geometric divergence, and atmospheric absorption which are predicted accurately. The term $A_{ij\_unknown}$ corresponds to the contribution of unpredictable components and the term $\omega$ is angular frequency corresponding to the octave band having a mid frequency f. The Eq. (2) may be modified based on the Eq. (5) and the plurality of attenuation coefficients may be determined by modified linear equation. The plurality of attenuation coefficients determined based on the modified matrix equation of Eq. (1) exhibit better numerical stability.

Figure 3:
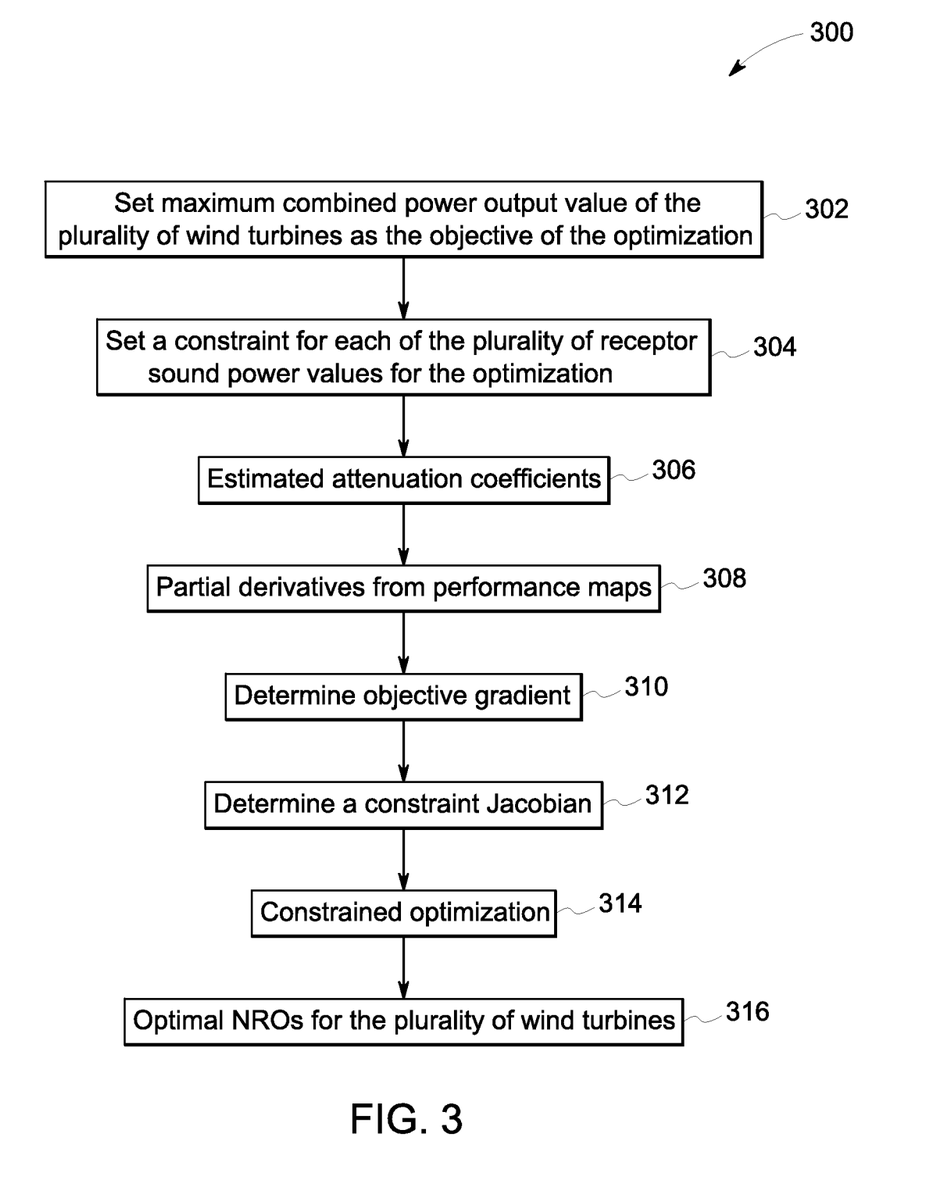
FIG. 3 is a flow chart of constrained optimization technique in accordance with an exemplary embodiment.

FIG. 3 is a flow chart 300 of constrained optimization technique in accordance with an exemplary embodiment. The constrained optimization technique disclosed herein determines the plurality of turbine set-points corresponding to the plurality of wind turbines in the wind farm based on prevailing ambient conditions. In an exemplary embodiment, at least one turbine set-point corresponding to at least one wind turbine among the plurality of wind turbines is determined through the constrained optimization technique.

The technique of determining at least one turbine set-point includes maximizing a combined power output value of the plurality of wind turbines as an objective function 302 of the constrained optimization. The objective function is given by:

$$f(x) = \max_{x_i} \sum_{i=1}^{N} P_{wi}(x_i, V_i) \qquad (6)$$

where, $x_i$ is a turbine set-point or a collection of a plurality of set-points for the wind turbine, $P_{wi}$ is power output of the $i^{th}$ wind turbine, and $V_i$ is the wind speed value corresponding to the $i^{th}$ wind turbine. In one embodiment, the turbine set-point is chosen from a plurality of Noise Reduced Operation (NRO) modes. The term noise reduced operation (NRO) mode used herein refers to a pre designed turbine operation condition achieving a particular maximum noise emission level at the turbine. The NRO modes would help in reducing the number of parameters to be optimized and ensures generating a feasibility solution from the constrained optimization.

The technique of determining the at least one set-point also includes selecting a regulation limit value for a receptor location as optimization constraint 304. The optimization constraint includes limiting each of the plurality of receptor sound pressure value. The constraint function c(x) is given by:

$$c(x) = \sum_{i=1}^{N_j} \sum_{f=1}^{8} \frac{1}{A_{ij,f}} P_{si,f}(x_i, V_i) \leq C_j(V_j) \qquad (7)$$

where, $A_{ij,f}$ is attenuation coefficient in an octave band having a mid frequency f, $P_{si,f}$ is the source sound power value of the $i^{th}$ wind turbine in the octave band with mid frequency f. The symbol Cj is the regulation limit value corresponding to the $j^{th}$ receptor location and Vj refers to the wind velocity at the $j^{th}$ receptor location. The constant Nj refers to the number of wind turbines contributing to the noise at the $j^{th}$ receptor location and the index j refers to one of the M receptor locations.

The plurality of attenuation coefficients, estimated by the noise attenuation estimation module as explained previously, are used in the optimization technique 306. The constrained optimization requires partial derivatives of the plurality of power outputs and the plurality of source sound power values. In one embodiment, the partial derivatives are determined based on the wind turbine performance maps 308. In an alternate embodiment, turbine rotor aerodynamic and aero-acoustic simulations may be used to determine the partial derivatives. In another embodiment, the partial derivatives are determined by the plurality of power output values and the plurality of source sound power values.

The derivative of the objective function, is given by:

$$\frac{\partial f}{\partial x_i} = \frac{\partial P_{wi}}{\partial x_i}(x_i, V_i) \qquad (8)$$

and the derivative of the constrained function, is given by:

$$\frac{\partial c_j}{\partial x_i}(x, V) = \sum_{f=1}^{8} \frac{1}{A_{ij,f}} \frac{\partial P_{si,f}}{\partial x_i}(x_i, V_i). \qquad (9)$$

The partial derivative of the objective function is referred herein as 'objective gradient' and the partial derivative of the constraint function is referred herein as the 'constraint Jacobian'. The objective gradient and the constraint Jacobian are determined 310, 312 based the partial derivatives and the attenuation constants.

A constrained optimization having the objective function of Eq. (6) constrained by Eq. (7) is performed 314 based on the objective gradient and the constraint Jacobian of Eq. (8) and Eq. (9) respectively to determine optimal set-point 316 for each wind turbine of the wind farm. In one embodiment, a direct search method is used to determine the partial derivative values. In another embodiment, the partial derivative values are retrieved from a memory location. In some embodiments, a gradient descent method is used to determine the optimal set-point. In alternative embodiments, any other numerical technique including but not limited to convex programming method, and stochastic method may also be used.

Figure 4:
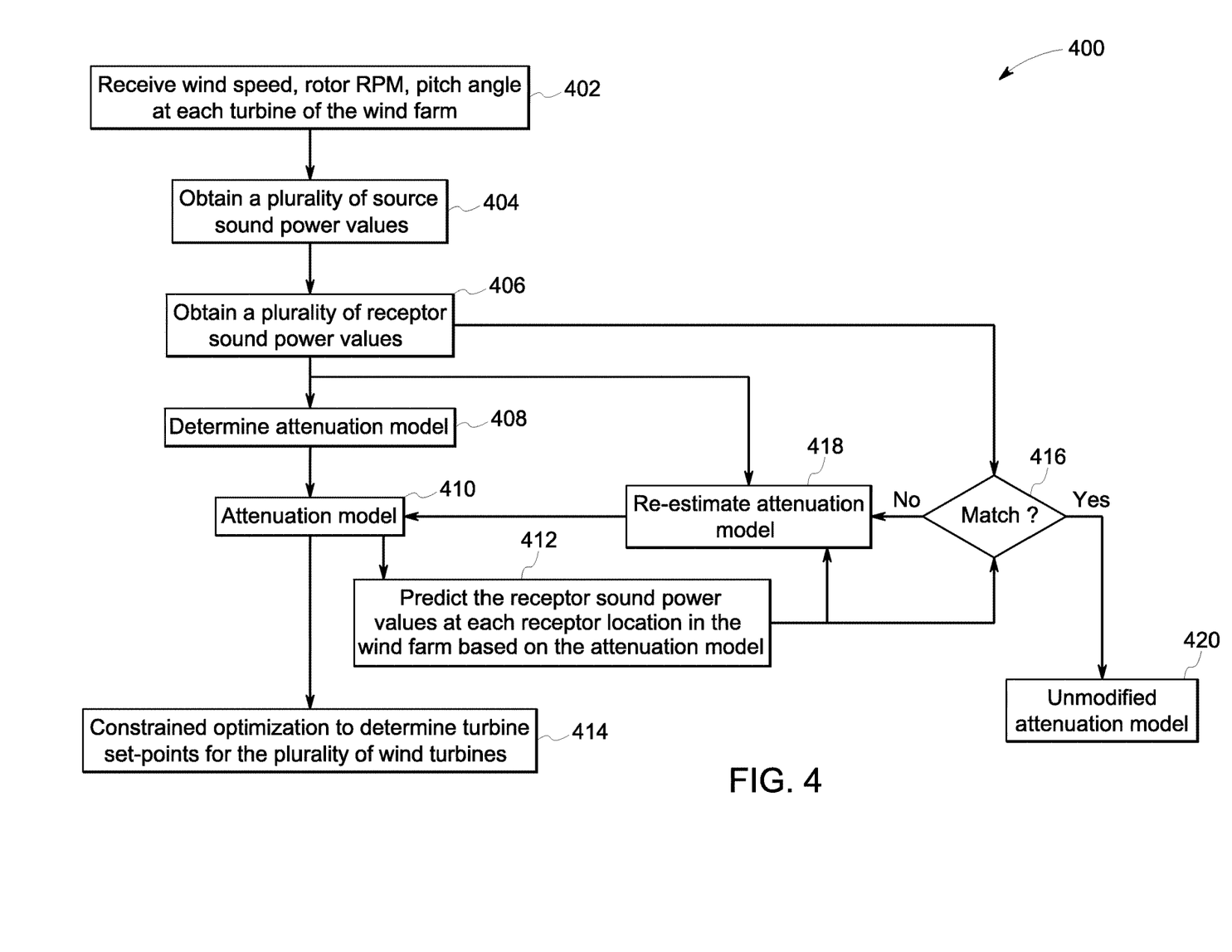
FIG. 4 is a flow chart illustrating a method for determining operating set-points for the plurality of wind turbines in accordance with an exemplary embodiment.

FIG. 4 is a flow chart 400 illustrating a method for optimizing operation of the wind farm in accordance with an exemplary embodiment. The method includes receiving wind speed value, an angular speed value of the rotor in terms of rotations per minute (RPM), at least one pitch angle corresponding to each turbine of the wind farm 402. The plurality of source sound power values are obtained 404 from a plurality of microphones disposed at the plurality of wind turbines of the wind farm. The plurality of receptor sound pressure values are obtained 406 from a plurality of microphones disposed at the plurality of receptor locations. An attenuation model is determined based on the plurality of source sound power values, the plurality of receptor sound pressure values, and operational parameters of the plurality of wind turbines 408.

The attenuation model 410 includes a plurality of attenuation coefficients corresponding to each of a plurality of octave frequency bands. In one embodiment, the attenuation model 410 is determined based on the plurality of source sound power values and the plurality of receptor sound pressure values obtained through measurements, computed from step 408. In another embodiment, the attenuation model 410 is re estimated from step 418, when the ambient conditions of the wind farm are changed. The method of re-estimation of attenuation model 418 is further explained in a subsequent paragraph.

In one embodiment, the receptor sound pressure value at each of the plurality of receptor locations is predicted based on the attenuation model and the plurality of source sound power values 412. The constrained optimization is performed to determine an optimal set-point for at least one wind turbine among the plurality of wind turbines 414. In one embodiment, the constrained optimization 414 is performed once every minute. In another embodiment, the constrained optimization 414 is performed once in ten minutes. The optimization is performed based on the plurality of receptor sound pressure values predicted in step 412. In another embodiment, the optimization is performed based on the plurality of receptor sound pressure values measured in step 406. The optimal set-point is communicated to the controller disposed on the at least one wind turbine and the operational parameters of the at least one wind turbine are adjusted based on the communicated optimal set-point. The power output value of the at least one wind turbine is modified corresponding to the new set of operational parameters. In alternate embodiments, at least one of the rotor speed and pitch angle setting are modified based on the new set of operational parameters.

In some embodiments where the receptor sound pressure value is predicted, the plurality of measured receptor sound pressure values are compared with the plurality of corresponding predicted values 416. In one embodiment, a plurality of difference values between the plurality of estimated receptor sound pressure values and the plurality of measured receptor sound pressure values are determined. Each of the plurality of difference values is compared with a predetermined threshold. When all the difference values are less than the predetermined threshold, the plurality of receptor sound pressure values obtained from measurements match with the plurality of receptor sound pressure values obtained by estimation. In such a case, the re-estimation of attenuation model is not required and the unmodified attenuation model 420 is same as the attenuation model 410. In one exemplary embodiment, the comparison 416 is performed once in every five minutes. In another embodiment, the comparison 416 is performed once every minute.

If at least one of the plurality of difference values exceeds a predetermined threshold, the receptor sound pressure value obtained from the measurement does not match with the receptor sound pressure value obtained from estimation. In such a case, the plurality of attenuation coefficients of the attenuation model are re-estimated 418. The attenuation model of 410 is updated with the plurality of attenuation coefficients re-estimated in step 418. In one embodiment, the predetermined threshold is provided by a user and is received by the signal acquisition module. In some embodiments, the re-estimate of the plurality of attenuation coefficients 418 is initiated based on a few consecutive comparisons in the step 416. In one example of such an embodiment, re-estimation 418 is initiated based on five consecutive comparisons 416 of the receptor sound pressure value obtained from the measurement with the receptor sound pressure value obtained from estimation. When one or more of the plurality of difference values exceeds the predetermined threshold in each of the five consecutive comparisons, re-estimation of the attenuation model is initiated.

Embodiments using a pre-determined attenuation model are termed herein as "offline methods". In an exemplary embodiment of the offline method, steps 402, 404, 406, 408, 410, 414 are used. A plurality of pre-computed attenuation models and corresponding ambient conditions are stored in a memory. The attenuation model 410 is chosen from the plurality of pre-computed attenuation models based on the measured ambient condition. Embodiments determining the attenuation model frequently at regular time intervals based on the plurality of source sound power values and the plurality of receptor sound pressure values are termed herein as "online methods". Online methods include re-estimation of the attenuation model at regular intervals. In an exemplary embodiment, the online method includes additional steps 412, 416, 418. When the plurality of receptor sound pressure measurements do not match with the plurality of receptor sound pressure estimates, re-estimation of the attenuation model 416 is initiated. In one exemplary embodiment, the re-estimation of the attenuation model 416 is performed once in six hours. In other embodiments, the re-estimation of the attenuation model 416 is performed once every day, once in a week or once in a month.

Exemplary embodiments disclosed herein provide a system and a method for optimizing the operation of a plurality of wind turbines operating in a wind farm. Operational optimization for noise constrained wind farms will result in higher energy yield of 2-4% of Annual Energy Production (AEP) compared to the state-of-the-art approaches which apply turbine operational set-points invariant over time. The far-field noise modeling disclosed herein leverages measurement data received directly in the field in enhancing the quality of estimation of the plurality of noise attenuation coefficients. The constrained optimization technique using the plurality of noise attenuation coefficients determines the at least one set-point with both greater confidence and accuracy. Disclosed embodiments enable use of simpler physics-based noise-attenuation models instead of sophisticated and simulation intensive models.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method comprising:
receiving a plurality of operational parameters corresponding to a plurality of wind turbines;
obtaining a plurality of source sound power values corresponding to sound power values generated by the plurality of wind turbines at the plurality of wind turbines;
obtaining a plurality of receptor sound pressure measurements corresponding to a plurality of receptor locations in a far-field location at least one kilometer away from the plurality of wind turbines;
estimating a physics-based attenuation model based on the plurality of source sound power values and the receptor sound pressure value, wherein the attenuation model comprises a plurality of attenuation coefficients;
determining, via the attenuation model, a plurality of receptor sound pressure estimates based on the plurality of source sound power values;
determining at least one difference value between the plurality of receptor sound pressure measurements and the plurality of receptor sound pressure estimates;
re-estimating the plurality of attenuation coefficients based on the plurality of difference values when at least one of the plurality of difference values exceeds a predetermined threshold;
determining at least one turbine set-point corresponding to at least one wind turbine among the plurality of wind turbines based on the plurality of attenuation coefficients and the plurality of turbine operational parameters; and
modifying a power output value of the at least one wind turbine by modifying at least one of the plurality of operational parameters and the at least one turbine set-point of the at least one wind turbine.

2. The method of claim 1, wherein the plurality of operational parameters comprises at least one of a pitch angle, a wind speed value, or a rotor speed value, corresponding to each of the plurality of wind turbines.

3. The method of claim 1, wherein obtaining the plurality of source sound power values comprises estimating the plurality of source sound power values based on the plurality of turbine operational parameters and a wind-turbine model.

4. The method of claim 1, wherein the plurality of receptor sound pressure measurements are received from a plurality of microphones disposed at the plurality of receptor locations.

5. The method of claim 1, wherein the estimating comprises determining the plurality of attenuation coefficients by a least squares method.

6. The method of claim 1, wherein the estimating comprises determining of the plurality of attenuation coefficients based on a far-field noise propagation model.

7. The method of claim 1, wherein determining the at least one set-point is based on a constrained optimization technique, wherein the constrained optimization technique constrains the receptor sound pressure value within a regulation limit value and maximizes a combined power output value of the plurality of wind turbines.

8. A system comprising:
a processor and a memory module coupled to a communications bus, the processor configured to:
receive a plurality of turbine operational parameters corresponding to a plurality of wind turbines;
obtain a plurality of source sound power values corresponding to sound power valued generated by the plurality of wind turbines at the plurality of wind turbines; and
obtain a plurality of receptor sound pressure measurements corresponding to a receptor location in a far-field location away at least one kilometer from the plurality of wind turbines;
estimate, via a physics-based attenuation model stored in the processor, a plurality of attenuation coefficients based on the plurality of source sound power values and the receptor sound pressure value;
determining, via the attenuation model, a plurality of receptor sound pressure estimates based on the plurality of source sound power values;
determining at least one difference value between the plurality of receptor sound pressure measurements and the plurality of receptor sound pressure estimates;
re-estimating the plurality of attenuation coefficients based on the plurality of difference values when at least one of the plurality of difference values exceeds a predetermined threshold; and
determine at least one set-point corresponding to at least one wind turbine among the plurality of wind turbines based on the plurality of attenuation coefficients and the plurality of turbine operational parameters; and
modify a power output value of the at least one wind turbine by modifying at least one of the plurality of operational parameters and the at least one turbine set-point of the at least one wind turbine.

9. The system of claim 8, wherein the processor is further configured to receive at least one of a rotor speed value, a wind speed value, or a pitch angle corresponding to each of the plurality of wind turbines.

10. The system of claim 8, wherein the signal acquisition module is further configured to estimate the plurality of source sound power values based on the plurality of turbine operational parameters and a wind-turbine model.

11. The system of claim 10, wherein the signal acquisition module is further configured to receive a plurality of receptor sound pressure measurements from a plurality of microphones disposed at the plurality of wind turbines and the plurality of receptor locations to obtain the receptor sound pressure value.

12. The system of claim 11, wherein the signal acquisition module is further configured to determine a plurality of receptor sound pressure estimates based on the plurality of source sound power values and the attenuation model to obtain the receptor sound pressure value.

13. The system of claim 12, wherein the attenuation model generator module is configured to:

determine a plurality of difference values between the plurality of receptor sound pressure estimates and the plurality of receptor sound pressure measurements; and modify the plurality of attenuation coefficients based on the plurality of difference values if at least one of the plurality of difference values exceeds a predetermined threshold.

14. The system of claim 8, wherein the attenuation model generator module comprises a far-field noise propagation model.

15. The system of claim 8, wherein the farm control optimization module is configured to perform a constrained optimization maximizing a combined power output value of the plurality of wind turbines constraining the receptor sound pressure value within a regulation limit value.

16. A wind farm comprising a plurality of wind turbines communicatively coupled to the signal acquisition module of the system of claim 8.

17. A non-transitory computer readable medium having instructions to enable at least one processor module to:

receive a plurality of turbine operational parameters corresponding to a plurality of wind turbines;

obtain a plurality of source sound power values corresponding to sound power values generated by the plurality of wind turbines at the plurality of wind turbines;

obtain a plurality of receptor sound pressure measurements corresponding to a receptor location in a far-field location away at least one kilometer from the plurality of wind turbines;

estimate a physics-based attenuation model having a plurality of attenuation coefficients based on the plurality of source sound power values and the receptor sound pressure value;

determine, via the attenuation model, a plurality of receptor sound pressure estimates based on the plurality of source sound power values;

determine at least one difference value between the plurality of receptor sound pressure measurements and the plurality of receptor sound pressure estimates;

re-estimate the plurality of attenuation coefficients based on the plurality of difference values when at least one of the plurality of difference values exceeds a predetermined threshold;

determine at least one set-point corresponding to at least one wind turbine among the plurality of wind turbines based on the plurality of attenuation coefficients and the plurality of turbine operational parameters; and modify a power output value of the at least one wind turbine by modifying at least one of the plurality of operational parameters and the at least one turbine set-point of the at least one wind turbine.

* * * * *